United States Patent
Breon et al.

(10) Patent No.: US 10,434,687 B2
(45) Date of Patent: Oct. 8, 2019

(54) COMPOSITE LAMINATE TOOLING AND METHOD OF FORMING A COMPOSITE PART USING THE TOOLING

(71) Applicant: Sikorsky Aircraft Corporation, Stratford, CT (US)

(72) Inventors: Joshua A. Breon, Lafayette, IN (US); Mario Dipreta, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 26 days.

(21) Appl. No.: 15/519,726

(22) PCT Filed: Dec. 10, 2015

(86) PCT No.: PCT/US2015/064980
§ 371 (c)(1),
(2) Date: Apr. 17, 2017

(87) PCT Pub. No.: WO2016/100081
PCT Pub. Date: Jun. 23, 2016

(65) Prior Publication Data
US 2017/0282413 A1    Oct. 5, 2017

Related U.S. Application Data

(60) Provisional application No. 62/093,220, filed on Dec. 17, 2014.

(51) Int. Cl.
*B29C 70/38*      (2006.01)
*B29C 70/54*      (2006.01)
(Continued)

(52) U.S. Cl.
CPC ............ *B29C 39/04* (2013.01); *B29C 33/308* (2013.01); *B29C 39/10* (2013.01); *B29C 39/12* (2013.01);
(Continued)

(58) Field of Classification Search
CPC ............ B29C 70/541; B29C 2043/143; B29C 2043/147; B29C 43/146; B29C 70/382;
(Continued)

(56) References Cited

U.S. PATENT DOCUMENTS 3,598,175 A    8/1971    Carl-Erik et al.
4,591,402 A    5/1986    Evans et al.
(Continued)

FOREIGN PATENT DOCUMENTS

EP    2660146 A1    11/2013
WO    2014060747 A1    4/2014

OTHER PUBLICATIONS

International Search Report and Written Opinion of the International Search Authority dated Feb. 18, 2016 in related PCT Application No. PCT/US2015/064980, 9 page.

*Primary Examiner* — William P Bell
(74) *Attorney, Agent, or Firm* — Cantor Colburn LLP

(57) ABSTRACT

A composite piece tool used to create a composite piece. The tool includes a substrate having a substrate surface, walls disposed on the substrate and extending from the substrate surface in a thickness direction of the composite piece to define opposite locations of longitudinal composite piece ends and composite piece sides, a tooling surface disposed to occupy an entirety of a space delimited by the walls and on which the composite piece formed and a servo controller coupled to the tooling surface and configured to move the tooling surface upwardly and downwardly relative to the substrate surface and walls to form the composite piece.

13 Claims, 4 Drawing Sheets

(51) Int. Cl.
- *B29C 39/04* (2006.01)
- *B29C 33/30* (2006.01)
- *B29C 64/245* (2017.01)
- *B29C 70/86* (2006.01)
- *B29C 39/10* (2006.01)
- *B29C 39/12* (2006.01)
- *B29C 70/30* (2006.01)
- *B64C 27/473* (2006.01)
- *B29C 70/46* (2006.01)
- *B64F 5/10* (2017.01)
- *B64C 27/48* (2006.01)
- *B64C 27/33* (2006.01)

(52) U.S. Cl.
CPC .......... *B29C 39/123* (2013.01); *B29C 64/245* (2017.08); *B29C 70/30* (2013.01); *B29C 70/382* (2013.01); *B29C 70/386* (2013.01); *B29C 70/46* (2013.01); *B29C 70/541* (2013.01); *B29C 70/86* (2013.01); *B64C 27/473* (2013.01); *B64F 5/10* (2017.01); *B64C 27/33* (2013.01); *B64C 27/48* (2013.01)

(58) Field of Classification Search
CPC ... B29C 70/386; B29C 33/308; B29C 64/147; B29C 64/245; B29C 39/146; B29C 41/32; B29C 64/141; B29C 64/165; B29L 2013/3088; B64C 27/48; B64C 27/33
See application file for complete search history.

(56) References Cited

U.S. PATENT DOCUMENTS

| | | | |
|---|---|---|---|
| 5,071,338 A | 12/1991 | Dublmslu et al. | |
| 5,134,569 A * | 7/1992 | Masters | B29C 35/08 156/272.8 |
| 5,354,414 A * | 10/1994 | Feygin | B22C 9/00 156/245 |
| 5,936,861 A * | 8/1999 | Jang | B29C 70/384 700/98 |
| 5,939,007 A | 8/1999 | Iszczyszyn et al. | |
| 6,708,921 B2 | 3/2004 | Sims et al. | |
| 6,824,714 B1 * | 11/2004 | Turck | B29C 64/153 264/308 |
| 7,165,945 B2 | 1/2007 | Kovalsky | |
| 7,407,556 B2 | 8/2008 | Oldani et al. | |
| 7,555,404 B2 | 6/2009 | Brennan et al. | |
| 7,835,567 B2 | 11/2010 | Oldani | |
| 8,327,738 B2 | 12/2012 | Davis et al. | |
| 8,333,864 B2 | 12/2012 | Brennan et al. | |
| 8,372,231 B1 | 2/2013 | Tsotsis | |
| 8,695,922 B2 | 4/2014 | Schroeer et al. | |
| 8,714,226 B2 | 5/2014 | Senibi et al. | |
| 9,505,489 B2 * | 11/2016 | Sutton | B64C 27/32 |
| 2001/0039811 A1 | 11/2001 | Tomisaka | |
| 2005/0280189 A1 * | 12/2005 | Macke, Jr. | B29C 64/135 264/497 |
| 2009/0217529 A1 | 9/2009 | Cerezo et al. | |
| 2011/0041988 A1 | 2/2011 | Nelson | |
| 2012/0045344 A1 | 2/2012 | Byrnes et al. | |
| 2012/0076973 A1 | 3/2012 | Guzman et al. | |
| 2013/0048213 A1 | 2/2013 | Jessrang | |
| 2013/0186557 A1 | 7/2013 | Cramer et al. | |
| 2014/0033479 A1 | 2/2014 | Dilo | |
| 2014/0065343 A1 * | 3/2014 | Hess | B22F 3/1055 428/63 |
| 2014/0288893 A1 * | 9/2014 | Blom | G06F 17/5018 703/1 |

* cited by examiner

COMPOSITE LAMINATE TOOLING AND METHOD OF FORMING A COMPOSITE PART USING THE TOOLING

CROSS-REFERENCE TO RELATED APPLICATIONS

The present application is a 371 National Stage of International Patent Application No. PCT/US2015/064980, filed on Dec. 10, 2015, which claims priority to U.S. Provisional Application No. 62/093,220, filed on Dec. 17, 2014, the contents of which are incorporated herein by reference in their entirety.

BACKGROUND OF THE INVENTION

The subject matter disclosed herein relates to composite laminate tooling and, more particularly, to tail rotor blade flexbeam tooling.

A rotor blade flexbeam is a primary structural element of a helicopter tail rotor blade assembly inasmuch as its primary function is to transfer combined flapwise, edgewise and centrifugal loads to and/or from a central torque drive hub member. These features are sometimes formed with fiber reinforced resin matrix composite materials due to their advantageous strength-to-weight ratios, however, widespread use thereof has been impeded despite the inherent weight and strength advantages by the high cost of materials and associated fabrication methods.

Conventional methods for manufacturing composite flexbeams include prepreg lay-ups of composite material. Although effective, these processes are relatively time and labor intensive. Normally, prepreg lay-up processes are primarily performed by hand and prepregs have little structural rigidity in their uncured state. The prepregs are hand-stacked and interleaved upon a tooling surface with tooling side walls, which provide the reaction forces at the perimeter profile of the flexbeam. The tail rotor flexbeam is then finished using autoclave processing and employment of a composite caul plate to transfer pressures and to control spar dimensional tolerances during the cure process.

The prepreg lay-up process of stacking composite materials into a female tooling mold cavity is prone to thickness variability and poor composite quality. Additional, destructive quality coupon testing is performed on all specimens where the specimens are removed before final machining such that minimum coupon strength is required for quality control to insure that process variability meets engineering specifications. In addition, existing processes for rectangular components cannot easily direct fibers in off-axis axial directions. They also create a part that is oversized and must be trimmed later in a subsequent operation. The resultant of the machining is cut fibers in the axial direction that when subjected to tension fatigue loads can splinter and propagate into the laminate. Moreover, a typical automated fiber placement machine head may be very large for handling and working with flexbeam composite tooling.

BRIEF DESCRIPTION OF THE INVENTION

According to one aspect of the invention, a composite piece tool used to create a composite piece includes a substrate having a substrate surface, walls disposed on the substrate and extending from the substrate surface in a thickness direction of the composite piece to define opposite locations of longitudinal composite piece ends and composite piece sides, a tooling surface disposed to occupy an entirety of a space delimited by the walls and on which the composite piece formed and a servo controller coupled to the tooling surface and configured to move the tooling surface upwardly and downwardly relative to the substrate surface and walls to form the composite piece.

In accordance with additional or alternative embodiments, the tooling surface has a contoured topography, and the servo controller controls the tooling surface to move as composite elements are laid up to form the composite piece.

In accordance with additional or alternative embodiments, the walls include first and second walls disposed define the opposite locations of the longitudinal composite piece ends and third and fourth walls disposed to define the opposite locations of the composite piece sides.

In accordance with additional or alternative embodiments, at least the first and second walls include contoured interior facing surfaces.

In accordance with additional or alternative embodiments, the tooling surface is disposed to occupy an entirety of a space delimited by the first, second, third and fourth walls.

In accordance with additional or alternative embodiments, the tooling surface is rigid.

In accordance with additional or alternative embodiments, sealant is disposed between the walls and the tooling surface.

In accordance with additional or alternative embodiments, the servo controller is configured to position the tooling surface in alignment with upper-most surfaces of the walls.

In accordance with additional or alternative embodiments, the servo controller is configured to move the tooling surface by a distance substantially equal to a thickness of a composite laminate ply placed on the tooling surface.

According to another aspect of the invention, a method of manufacturing a composite piece using a tool having a tooling surface disposed to occupy an entirety of a space delimited by walls in alignment with upper-most surfaces of the walls. The method includes laying a composite laminate ply on the tooling surface and moving the tooling surface relative to the upper-most surfaces of the walls by a distance substantially equal to a thickness of the composite laminate ply and repeating the laying of the composite laminate ply and the moving of the tooling surface.

In accordance with additional or alternative embodiments, the tooling surface includes a contoured topography having summits and troughs, and the repeating the laying of the composite laminate ply and the moving of the tooling surface includes laying composite laminate plies having varying shapes.

In accordance with additional or alternative embodiments, the method further includes forming the composite laminate ply as a pre-impregnated tow.

In accordance with additional or alternative embodiments, the method further includes forming the composite laminate ply with steered fiber placement.

In accordance with additional or alternative embodiments, the method further includes forming the composite laminate ply by an automated fiber placement (AFP) machine.

In accordance with additional or alternative embodiments, the method further includes curing each of the composite laminate plies.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a structurally efficient composite flexbeam tool is provided for the manufacture of an automated fiber placed (AFP) tail rotor blade flexbeam (hereinafter referred to as a "flexbeam"). The tool allows for the location of fibers in a particular orientation, minimizes weight, steers fibers and exhibits a perimeter tooling wall, which is a critical tooling aspect desired for structural integrity of the final cured part. Furthermore, the tool provides for an inexpensive manufacturing process that reduces labor intensive process steps, permits ease of material handling and maintains exacting quality standards during assembly.

Figure 1:
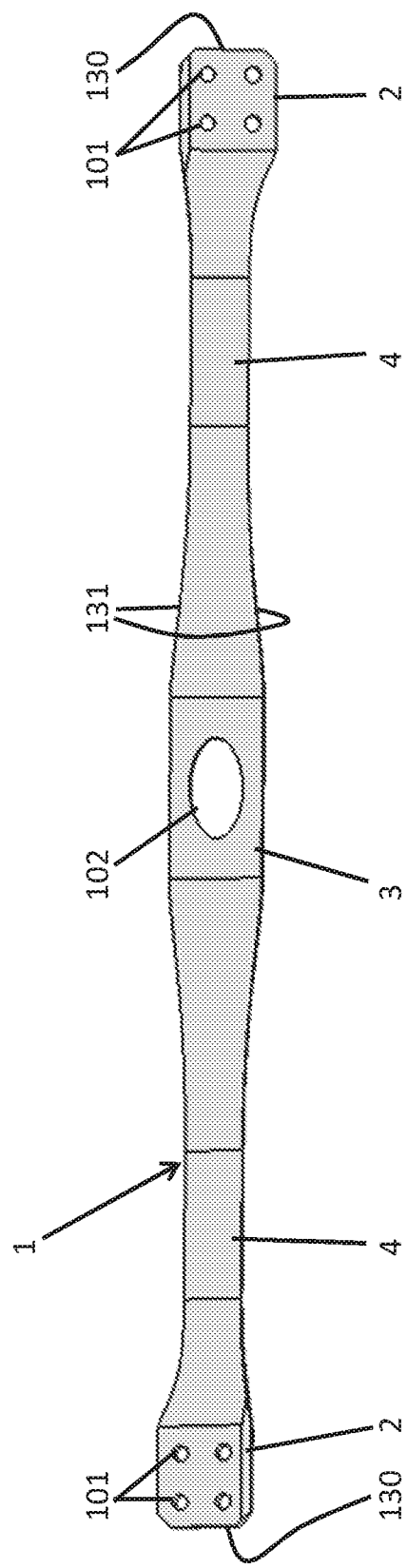
FIG. 1 is a perspective view of a flexbeam in accordance with embodiments.

With reference to FIG. 1, a composite piece or flexbeam 1 is provided. The flexbeam 1 is formed of multiple composite laminate plies as will be described below and can have multiple shapes, sizes and configurations. In one exemplary configuration, the flexbeam 1 includes first and second end sections 2, a central section 3 interposed between the first and second end sections 2 and intermediate sections 4 that provide for transitions between the first and second end sections 2 and the central section 3. As shown in FIG. 1, the first and second end sections 2 are relatively wide (i.e., in the width and thickness dimensions) as compared to the intermediate sections 4, which are relatively narrow (i.e., in the width and thickness dimensions). As shown, the thickness dimension is into the drawing in FIG. 1, the width dimension is perpendicular to the thickness dimension and a length dimension extending between the end sections 2 is perpendicular to both the thickness and width dimensions.

Figure 2:
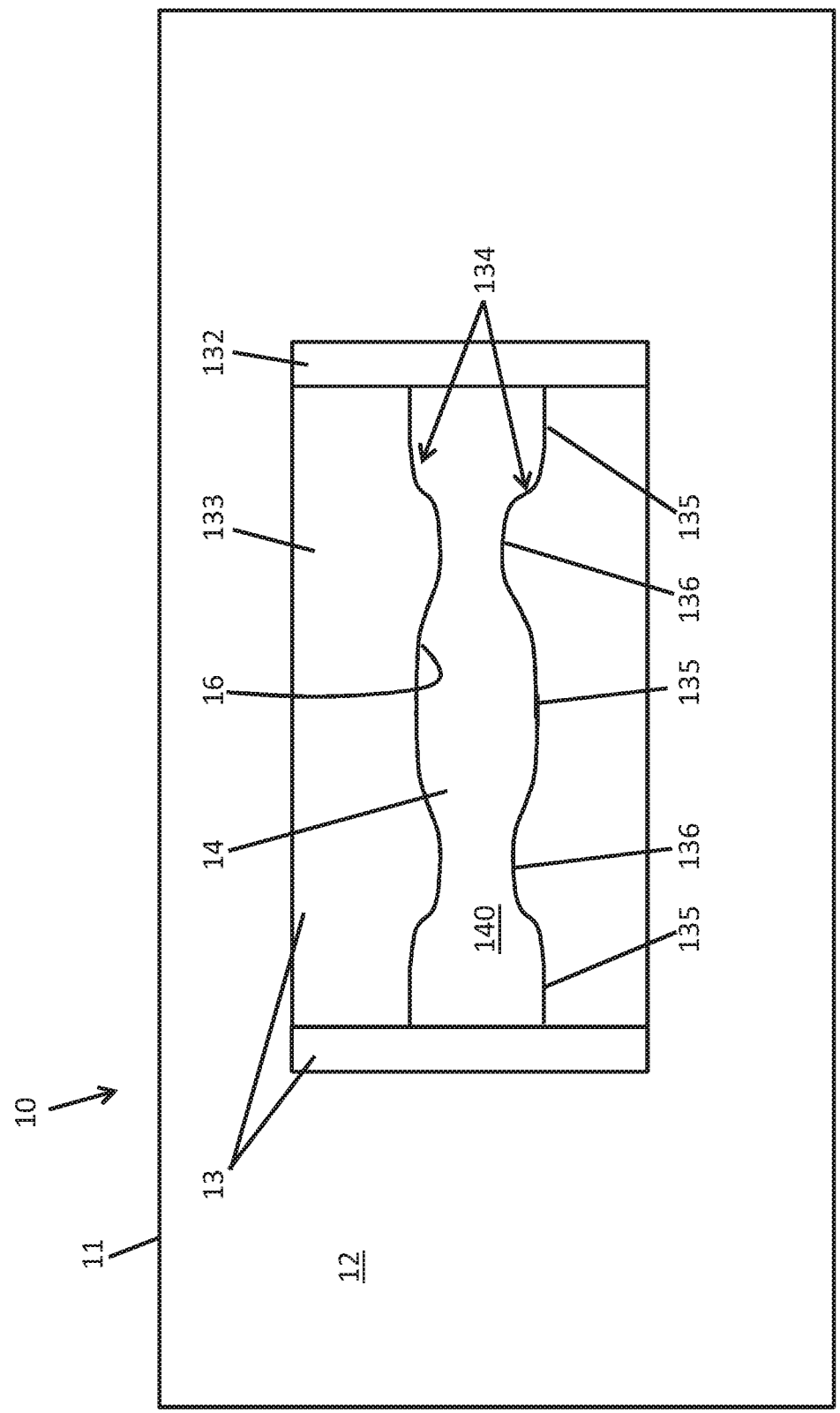
FIG. 2 is a plan view of a flexbeam tool in accordance with embodiments.
Figure 3:
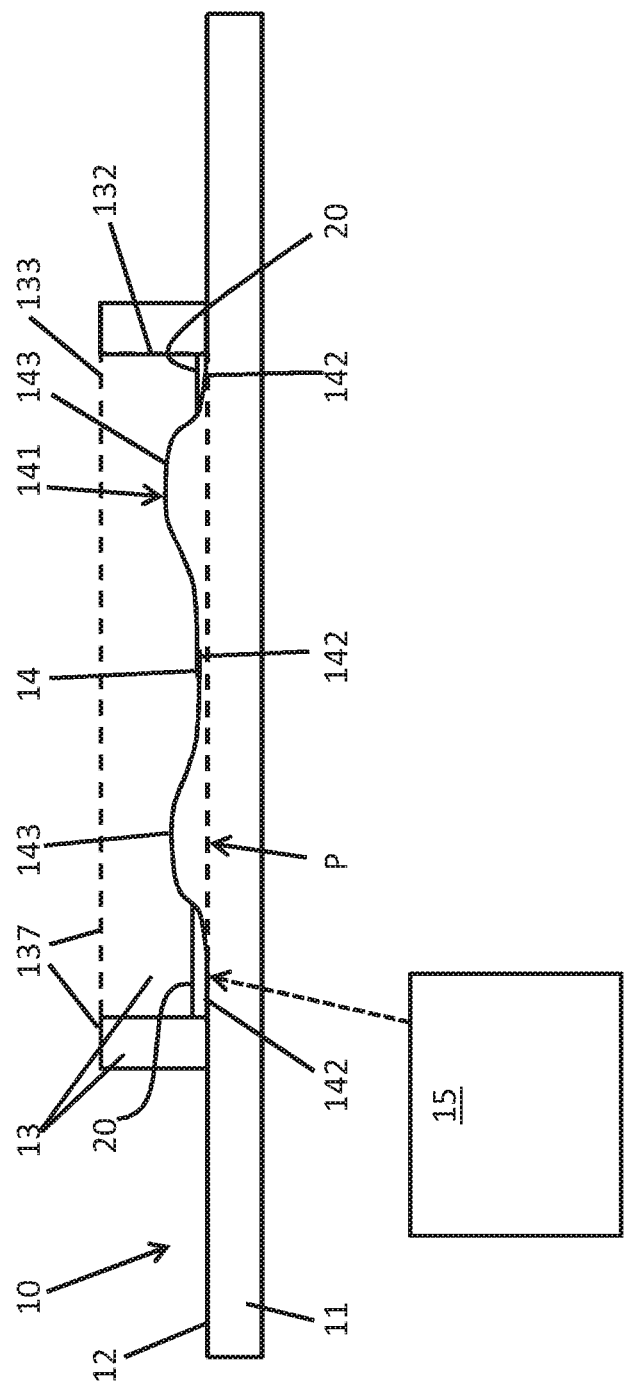
FIG. 3 is an elevational view of the flexbeam tool of FIG. 2.

With reference to FIGS. 2 and 3, a composite piece or flexbeam tool 10 is provided to facilitate manufacture of the flexbeam 1. The flexbeam tool 10 includes a substrate 11 that has an upwardly facing substrate surface 12, walls 13 that are disposed on the substrate 11 and extend upwardly from the substrate surface 12 to define opposite locations of longitudinal flexbeam ends 130 and flexbeam sides 131 (see FIG. 1), an upwardly facing tooling surface 14 and a servo controller 15. The tooling surface 14 is rigid and is disposed to occupy an entirety of a space 140 that is delimited by interior surfaces of the walls 13. The servo controller 15 (see FIG. 3) is coupled to the tooling surface 14 and configured to move the tooling surface 14 upwardly and downwardly relative to the substrate surface 12 (i.e., in the thickness dimension of FIG. 1). That is, where the substrate surface 12 defines a plane, P, the servo controller 15 moves the tooling surface 14 upwardly and downwardly in a direction substantially oriented normal to the plane, P. The flexbeam tool 10 may further include sealant 16 disposed between the walls 13 and the tooling surface 14 to prevent leakage of liquid or epoxy resin.

In accordance with embodiments and, as shown in FIG. 3, the tooling surface 14 may have a contoured topography 141. This contoured topography 141 is reflective of the final shape, form and size of the flexbeam 1 and thus may include troughs 142 that are associated with the wide first and second end sections 2 and the wide central section 3 of the flexbeam 1 as well as summits 143 that are associated with the narrow intermediate sections 4 of the flexbeam 1.

In accordance with further embodiments and, as shown in FIG. 2, the walls 13 may include first and second walls 132 that are disposed define the opposite locations of the longitudinal flexbeam ends 130 and third and fourth walls 133 that are disposed to define the opposite locations of the flexbeam sides 131. Of these, at least the first and second walls 132 may have contoured interior facing surfaces 134. These contoured interior facing surfaces 134 are reflective of the final shape, form and size of the flexbeam being manufactured with the flexbeam tool 10 and thus may include lateral troughs 135 that are associated with wide end and central sections of the flexbeam and lateral summits 136 that are associated with narrow intermediate sections of the flexbeam.

The servo controller 15 is configured to position the tooling surface 14 in alignment with upper-most surfaces 137 of the walls 13. From this position, the servo controller 15 is configured to move the tooling surface 14 downwardly by a distance that is substantially equal to a thickness of a composite laminate ply placed on the tooling surface 14 as will be discussed below.

Each composite laminate ply includes multiple pre-impregnated tows that are fed from multiple spools into an automated fiber placement (AFP) machine head for dispensing into a course. Each tow is formed of toughened epoxy matrix and fiber material where multiple tows create a course and multiple courses of tows form a layer of composite material of a given thickness. In this layer of composite material, fibers may be orientated with respect to a reference rotational axis with zero degree courses located parallel to the longitudinal axis and with bias angled courses located and oriented non-parallel to the longitudinal axis. As each layer of composite material is laid down on the tooling surface 14 as a composite laminate ply from the AFP machine head, the AFP machine controls the servo controller 15 to move the tooling surface 14 downwardly by a distance that is substantially equal to the thickness dimension. Specifically, with each tow, the tooling surface 14 is gradually lowered while the thickness dimension is created. Thus, the walls 13 are not exposed to the AFP machine head and do not induce an interference condition.

Figure 4:
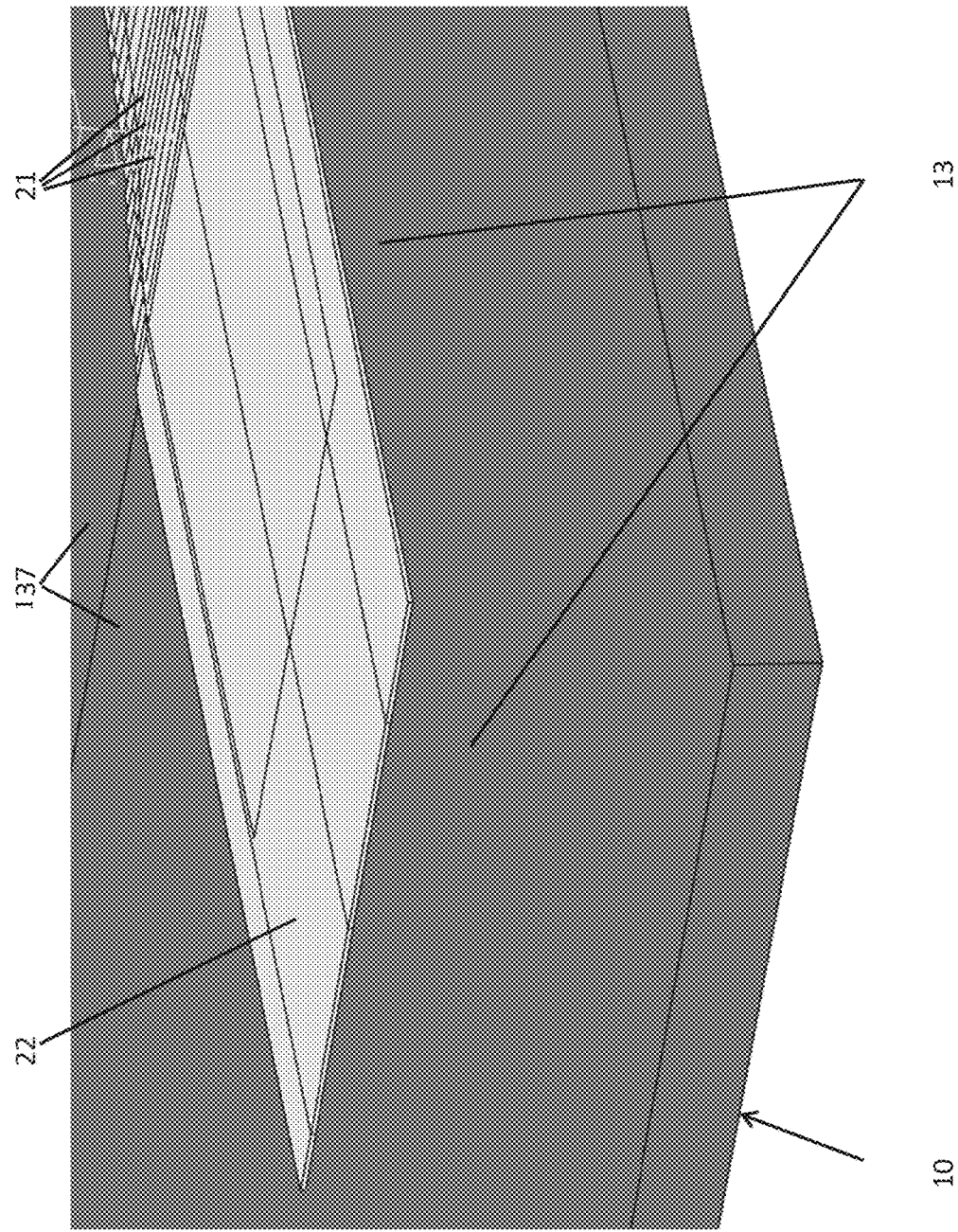
FIG. 4 is a perspective view of the flexbeam tool of FIGS. 2 and 3 in operation.

With reference back to FIG. 2 and with additional reference to FIG. 4, the flexbeam 1 is formed of multiple composite laminate plies of which a set of short plies 20 form a first layer, succeeding sets of sequentially enlarged plies form overlying layers, further succeeding sets of full-sized plies form further overlying layers, further succeeding sets of sequentially size-diminished plies 21 (see FIG. 4) form still further overlying layers and a final set of short plies 22 form a final layer (see FIG. 4). The set of short plies 20 forming the first layer and the succeeding sets of the sequentially enlarged plies forming the overlying layers cooperatively form lower regions of the first and second end sections 2 and the central section 3 of the flexbeam 1. Similarly, the further succeeding sets of sequentially size-diminished plies 21 forming the still further overlying layers and the final set of short plies 22 forming the final layer cooperatively form upper regions of the first and second end sections 2 and the central section 3 of the flexbeam 1. Meanwhile, the further succeeding sets of full-sized plies forming the further overlying layers cooperatively form the middle region of the flexbeam 1, which includes the first and second end sections 2, the central section 3 and the intermediate section 4.

The above-described configuration of the flexbeam 1 is achieved by forming the tooling surface 14 with the contoured topography 141, disposing the tooling surface 14 to occupy the entirety of the space 140, which is delimited by the walls 13 and positioning the tooling surface 14 in alignment with the upper-most surfaces 137 of the walls 13. Then, as noted above, a composite laminate ply (i.e., the set of short plies 20) is laid on the tooling surface 14 and the tooling surface 14 is moved downwardly by a distance substantially equal to a thickness of the composite laminate ply. The ply laying and tooling surface moving operations are repeated until the final set of short plies 22 are laid down. At this point, the flexbeam tool 10 is placed in an autoclave and each of the composite laminate plies is cured.

In accordance with additional embodiments and, with reference back to FIG. 1, the fibers in each composite laminate ply may be precision located and steered to avoid the end section holes 101, the central section holes 102, which may be elliptical, and other features of the flexbeam 1. Once the curing process is complete, the resulting part is complete in planform and has a high axial strength from no-cut fiber endings that typically is a result from secondary machining of the part planform. The no-cut fiber endings results from AFP processing in which the fibers are directed around corners and edges of the composite laminate plies.

The steering of the fibers around the central section holes 102 allows for fiber continuity, which (in concert with the no-cut conditions) may provide for dictation of load paths around the central section holes 102. By contrast, conventional processes where the center of rotation elliptical holes are machined and the fibers are straight and parallel to the longitudinal axis results in machined ply endings. Such machined ply endings at the central section holes 102 are minimized or eliminated as described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while described in terms of manufacture of a specific shape, it is understood that aspects of the invention can be used to create other composite piece shapes having additional or fewer summits and troughs, and that other ply arrangements are possible. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A composite piece tool used to create a composite flexbeam for a rotor blade, the tool comprising:
   a substrate having a substrate surface;
   walls disposed on the substrate and extending from the substrate surface in a thickness direction of the composite flexbeam to define opposite locations of longitudinal composite flexbeam ends and composite flexbeam sides, at least two of the walls including contoured interior facing surfaces;
   a tooling surface disposed to occupy an entirety of a space delimited by the walls and on which the composite flexbeam is formed, the tooling surface including a contoured topography, the contoured topography of the tooling surface and the contoured interior facing surfaces defining a geometry of the flexbeam; and
   a servo controller coupled to the tooling surface and configured to move the tooling surface upwardly and downwardly relative to the substrate surface and the walls to form the composite flexbeam, wherein the servo controller is configured to move the tooling surface downwardly and away from an uppermost surface of the walls a distance substantially equal to a thickness of a composite ply placed on the tooling surface, wherein the servo controller shifts the tooling downwardly such that the flexbeam fills a space defined the tooling surface and the walls.

2. The composite piece tool according to claim 1, wherein the walls comprise:
   first and second walls disposed to define the opposite locations of the longitudinal composite flexbeam ends; and
   third and fourth walls disposed to define the opposite locations of the composite flexbeam sides.

3. The composite piece tool according to claim 2, wherein at least the first and second walls comprise the at least two walls having the contoured interior facing surfaces.

4. The composite piece tool according to claim 2, wherein the tooling surface is disposed to occupy an entirety of a space delimited by the first, second, third and fourth walls.

5. The composite piece tool according to claim 1, wherein the tooling surface is rigid.

6. The composite piece tool according to claim 1, further comprising sealant disposed between the walls and the tooling surface.

7. The composite piece tool according to claim 1, wherein the servo controller is configured to position the tooling surface in alignment with upper-most surfaces of the walls.

8. A method of manufacturing a composite flexbeam for a rotor blade using a tool having a tooling surface including a contoured topography moveably mounted relative to a supporting substrate and disposed to occupy an entirety of a space delimited by walls including contoured interior facing surfaces in alignment with upper-most surfaces of the walls; the method comprising:
   laying a composite laminate ply on the tooling surface;
   moving the tooling surface relative to the walls and the substrate downwardly and away from the upper-most surfaces of the walls by a distance substantially equal to a thickness of the composite laminate ply;
   laying another composite laminate ply onto the composite laminate ply; and
   moving of the tooling surface relative to the walls and the substrate further away from the upper-most surfaces of the walls by the distance substantially equal to a thickness of the another composite laminate ply such that a flexbeam is formed that fills a space defined by the tooling surface and the walls.

9. The method according to claim 8, wherein the contoured topography of the tooling surface includes summits and troughs, and the repeating the laying of the composite laminate ply and the moving of the tooling surface comprises laying composite laminate plies having varying shapes.

10. The method according to claim 8, further comprising forming the composite laminate ply as a pre-impregnated tow.

11. The method according to claim 8, further comprising forming the composite laminate ply with steered fiber placement.

12. The method according to claim 8, wherein the laying of the composite plies further comprises forming the composite laminate ply by an automated fiber placement (AFP) machine.

13. The method according to claim 8, further comprising curing each of the composite laminate plies.

\* \* \* \* \*